(12) United States Patent
Swist

(10) Patent No.: US 8,602,428 B2
(45) Date of Patent: Dec. 10, 2013

(54) METHODS OF VEHICLE SUSPENSION

(76) Inventor: Jason Swist, Edmonton (CA)

(*) Notice: Subject to any disclaimer, the term of this patent is extended or adjusted under 35 U.S.C. 154(b) by 0 days.

(21) Appl. No.: 13/433,430

(22) Filed: Mar. 29, 2012

(65) Prior Publication Data

US 2012/0256388 A1  Oct. 11, 2012

Related U.S. Application Data

(60) Provisional application No. 61/471,752, filed on Apr. 5, 2011.

(51) Int. Cl.
*B60G 3/18* (2006.01)

(52) U.S. Cl.
USPC .................................................. 280/124.136

(58) Field of Classification Search
USPC .............. 280/124.134, 124.135, 124.136, 280/124.144, 124.145, 124.152
See application file for complete search history.

(56) References Cited

FOREIGN PATENT DOCUMENTS

DE  3134201 A  * 3/1983
JP  11028921 A  * 2/1999

* cited by examiner

*Primary Examiner* — Faye M. Fleming
(74) *Attorney, Agent, or Firm* — Greer, Burns & Crain, Ltd.

(57) ABSTRACT

Suspension systems must tradeoff multiple purposes including contributing to the vehicle's road holding/handling and braking for good active safety and driving pleasure as well as keeping vehicle's user(s) comfortable and reasonably well isolated from road noise, bumps, and vibrations, etc. Over the past 100 years many suspension systems have evolved but have in common the disposition of the hock absorber between the wheel and the fulcrum point of the wheel mounting to the vehicle. It would be, however, be beneficial to provide a suspension exploiting a dual-shock system wherein the two shock absorbers are in opposite states so that even under absorption of the vertical shock from the road surface there was still applied additional force for road contact to be maintained. It can also be shown to be beneficial in single-shock systems to place the shock the opposite side of the fulcrum point of the suspension system, counter to previous prior art solutions.

11 Claims, 11 Drawing Sheets

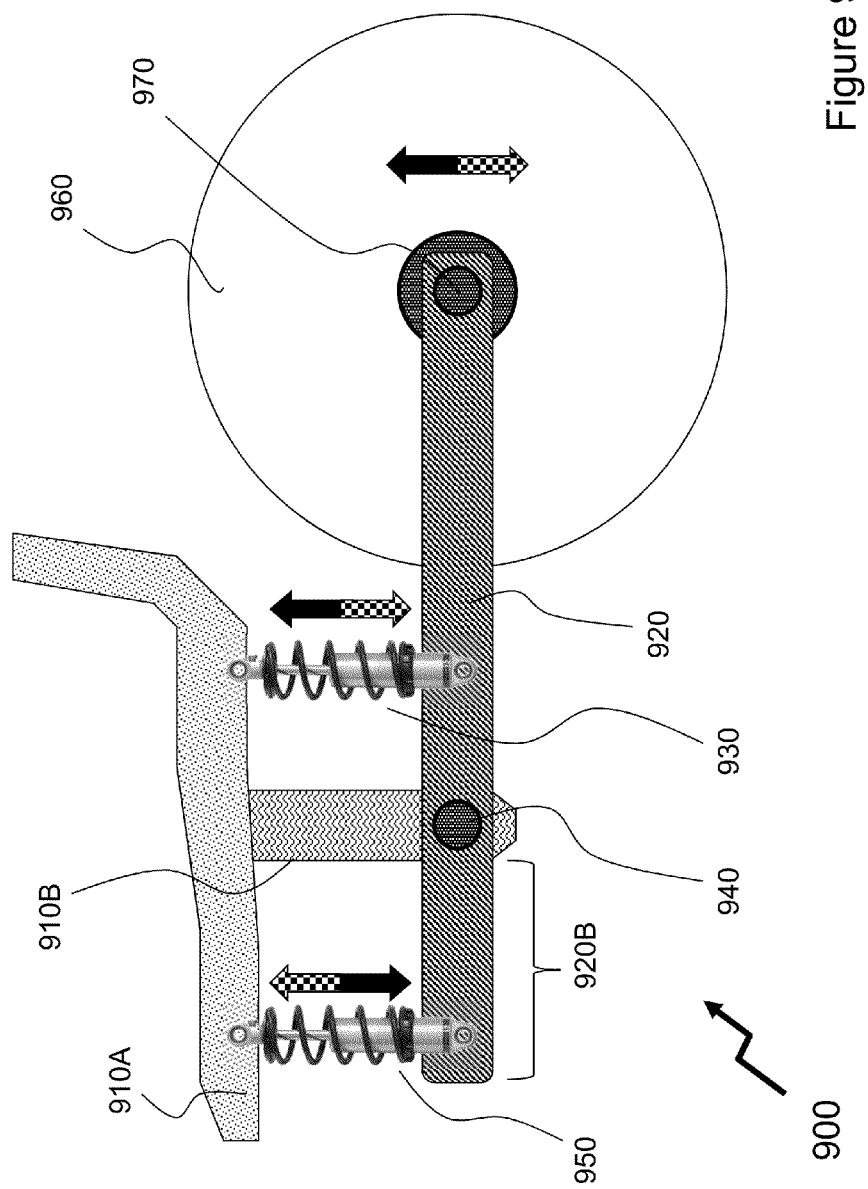

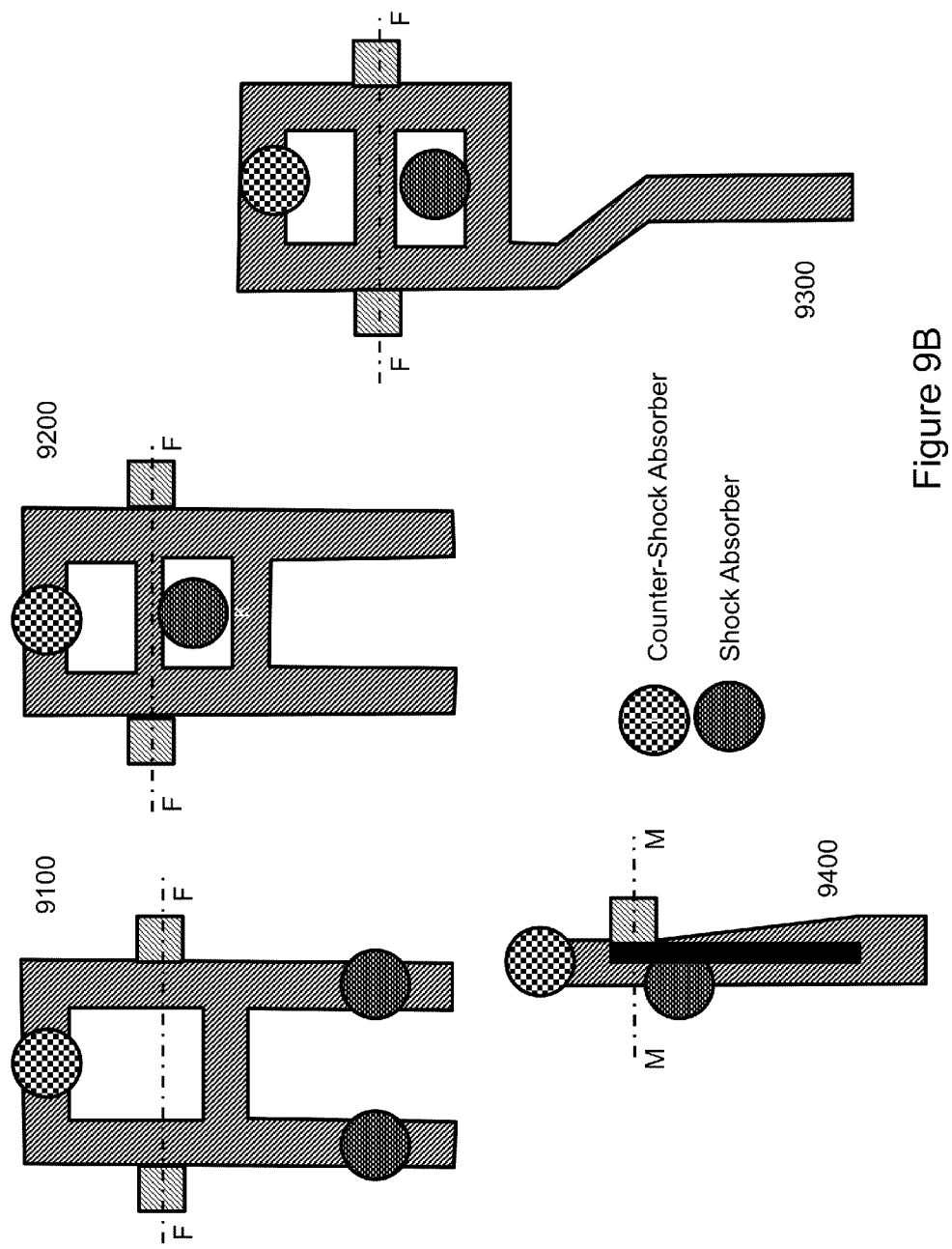

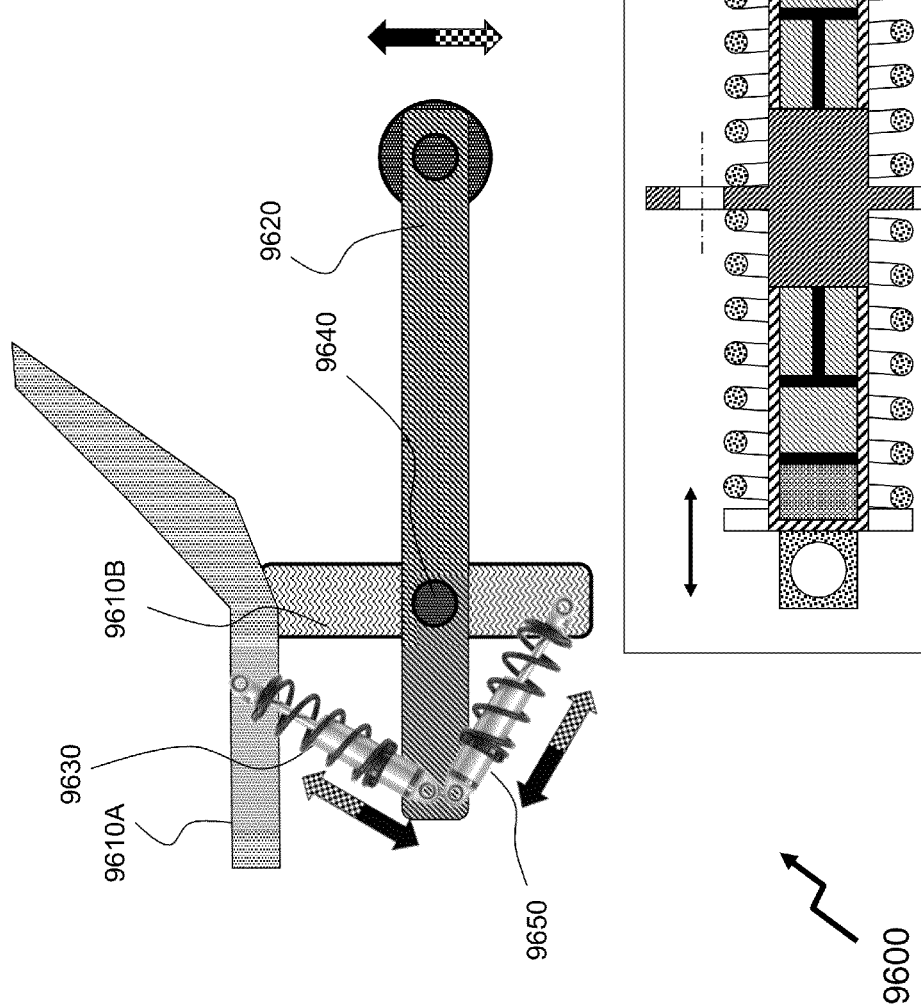

METHODS OF VEHICLE SUSPENSION

CROSS-REFERENCE TO RELATED APPLICATIONS

This patent application claims the benefit of U.S. Provisional Patent Application 61/471,752 filed Apr. 5, 2011 entitled "Methods of Vehicle Suspension."

FIELD OF THE INVENTION

This invention relates to suspension systems for vehicles and more particularly to rear suspensions for motorcycles and front suspensions for automobiles.

BACKGROUND OF THE INVENTION

Suspension is the name given to the system of springs, shock absorbers and linkages that connects a vehicle to its wheels. Suspension systems serve multiple purposes including contributing to the vehicle's road holding/handling and braking for good active safety and driving pleasure as well as keeping vehicle's user(s) comfortable and reasonably well isolated from road noise, bumps, and vibrations, etc. These goals are generally at odds with one another, so the tuning of suspensions involves finding the right compromise. It is important for the suspension to keep the road wheel in contact with the road surface as much as possible, because all the forces acting on the vehicle do so through the contact patches of the tires. However, reducing the interaction between the vehicle and road surface improves the ride comfort for the user(s). Even for one class of vehicle, such as a car, there may be different balances in this compromise as a driver of a sports car wishes to have a different "feel" for the ride than say a driver of a family sedan or estate wagon with their family.

Further, the springs, shock absorbers and linkages will be designed differently even for a single vehicle model, such as for example a BMW 5-series, where it is offered as a conventional 4-door saloon and as a 5-door estate providing increased rear luggage/storage space and hence be designed for substantially heavier loading at the rear than the saloon. The design of front and rear suspensions of cars, trucks, all-terrain vehicles (ATVs), motorcycles are generally different and can vary further with each manufacturer and model. However, at their core they all function in essentially the same manner.

Across all vehicle types and suspension designs there is generally a common element within all of them, a single rear coil-over-shock system attached between the vehicle frame and wheel. Accordingly, for the entire complex mechanical system that is the suspension the constraints between comfort and wheel contact are now coupled through this single coil-over-shock system. The shock, also known as a shock absorber, dampens the vertical motion induced by the vehicle travelling across a rough surface and so should technically be referred to by their 'proper' name—dampers. If the vehicle only had springs forming the suspension then whilst vertical motion would be absorbed the vehicle would "boat and wallow" or "rock and roll" along the road surface road making the user physically sick at the least or crashing through the poor control they had of the vehicle. Either that or the incessant vibration would cause it to fall apart.

The shock performs two functions. Firstly, they absorb any larger-than-average bumps in the road so that the upward velocity of the wheel over the bump isn't transmitted to the vehicle chassis. Secondly, they keep the suspension at as full a travel as possible for the given road conditions so that the wheel is in contact with the road surface. However, by also being velocity-sensitive hydraulic damping systems the faster they move, the more resistance there is to that movement, and so their behaviour is different for slow variations in the road surface to rapid variations. They also work in conjunction with the springs which allow the movement of the wheel and allow the energy in the road shock to be transformed into kinetic energy of the unsprung mass, whereupon it is dissipated by the shock. The shock does this, typically, by forcing gas or oil through a constriction valve. Adjustable shock absorbers allow you to change the size of this constriction, and thus control the rate of damping.

Accordingly, it would be beneficial to provide a suspension that was based in some embodiments upon a dual-shock system wherein the two shocks were in opposite states so that even under absorption of the vertical shock from the road surface there was still applied additional force for road contact to be maintained. It can also be shown to be beneficial in single-shock systems to place the shock the opposite side of the fulcrum point of the suspension system, counter to previous prior art solutions.

SUMMARY OF THE INVENTION

It is an object of the present invention to mitigate disadvantages of prior art solutions to suspension systems for vehicles and more particularly to rear suspensions for motorcycles and front suspensions for automobiles.

In accordance with an embodiment of the invention there is provided a method comprising:
providing an arm comprising a hub disposed to one end of the arm for mounting a wheel and a mounting point disposed along the length of the arm for attaching the arm to a frame wherein the arm pivots about the mounting point;
a first shock absorber mounted at one end to the arm at a first predetermined point between the mounting point and the end of the arm with the hub and at the other end to a first predetermined point on the frame;
a second shock absorber mounted at one end to the arm at a second predetermined point between the mounting point and another distal end of the arm and at the other end to a second predetermined point on the frame; and
wherein vertical motion of the wheel results in either compression and expansion of the first shock absorber and the other of compression and expansion of the second absorber In accordance with an embodiment of the invention there is provided a method comprising:
providing a hub for mounting a wheel comprising an upper mount and a lower mount;
providing a lower arm coupled to the lower mount of the hub one on end and having a fulcrum mounting at the other distal end;
providing a first link mounted to the fulcrum mounting of the lower arm at one end and a frame at the other distal end;
providing an upper arm coupled to the upper mount of the hub at one end and having a fulcrum mounting at a first predetermined position on the upper arm between the one and the other distal end;
providing a second link mounted at one end to the fulcrum on the upper arm and to a second predetermined position on the frame; and
providing a shock absorber mounted at one end to the first link and at the other end to the upper arm at a predetermined location between the fulcrum on the upper arm and the distal end of the upper arm from the hub.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 9A depicts a schematic of a motorcycle suspension according to an embodiment of the invention;

FIG. 9B depicts modified suspensions according to embodiments of the invention;

FIG. 9D depicts a modified suspension according to an embodiment of the invention;

DETAILED DESCRIPTION

The present invention is directed to mitigating disadvantages of prior art solutions to suspension systems for vehicles and more particularly to rear suspensions for motorcycles and front suspensions for automobiles.

Considering firstly motorcycle suspension then the whilst front suspensions were almost universally adopted before 1914, rear suspensions were not and in fact some manufacturers did not use rear suspensions until after 1945. Amongst the earliest was the 1913 Indian Single with a swingarm suspended from a leaf spring and the 1913 Pope with wheels supported on a pair of plungers which were each suspended by a coil spring. Notable manufacturers of bikes with plunger suspension included Ariel, BMW, BSA, Indian, and Norton. However, these were gradually replaced by swingarms which evolved in many forms with time such that today motorcyclists unless interested in vintage motorcycles are unaware any other format existed.

Figure 2:
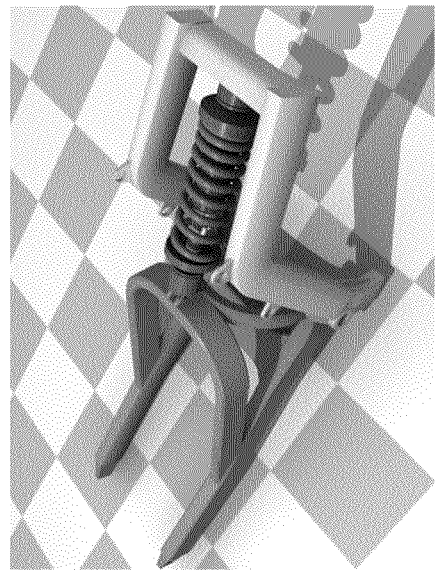
FIG. 2 depicts a prior art monoshock, old style, regular swingarm suspension for the rear wheel of a motorcycle.
Figure 1:
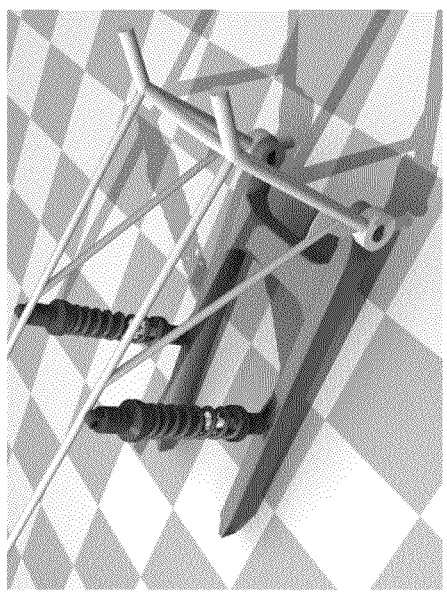
FIG. 1 depicts a twin-shock, regular swingarm suspension for the rear wheel of a motorcycle.

The classic modern motorcycle suspension system, the twin-shock with regular swingarm, depicted in FIG. 1, exploits an H-shaped swingarm that is pivoted at the front to the motorcycle frame. On either side there are basic coil-over-shock (coilover) units which provide the suspension and lasted until the 1980s when they began to fall out of favour due to weight considerations and the availability of newer, stronger materials. The monoshock, older style, regular swingarm as depicted in FIG. 2 had appeared in niche markets and racers in the late 1970s being based around designs that had been around in one form or another since the 1930's. However, their appearance on production motorcycles, especially those from the up and coming Japanese manufacturers at that time including Yamaha, Honda, and Suzuki for example led to their dominance commercially.

The premise was that manufacturers could save weight by redesigning the rear suspension and removing one of the coilover units with the monoshock now mounted centrally to the swingarm. In modern designs there is now a complex linkage at the bottom end which joins the coilover to the swingarm itself. The linkage adds leverage to the suspension plus it allows the coilover to be mounted more vertically. Ever seeking less weight and more speed this evolved to the variation shown in FIGS. 3A and 3B where the "basket" part of the swingarm has been removed and the design reverts to a more traditional "H" shaped arm.

Figure 4:
FIG. 4 depicts a prior art monoshock, single-sided swingarm suspension for the rear wheel of a motorcycle.

But even this was too heavy for some manufacturers, whilst also making the mounting/demounting of the wheel awkward. As such these evolved to the single-sided monoshock swingarm, such as shown in FIG. 4, made possible by super-strong, super-lightweight materials as they bear the all the stresses from the rear axle offset to one side. With the traditional double-beam swingarm, the design needs to have longitudinal stiffness to stop it from bending. With the single-sided design, it needs to also have torsional stiffness to stop it from twisting under the offset load. As a result, single-sided swingarms are typically a lot larger and have a huge amount of cross-bracing inside them.

The conversion from dual-shock to monoshock was a logical development. Dual-shock suspension units were typically mounted to the swingarm very close to the rear axle, such as shown in the upper portion of FIG. 5, which meant that as suspension compressed and expanded then so were the shock absorber pistons travelling in a stroke. Their stroke being nearly the same as the full deflection of the swingarm such that if a large bump deflected the rear axle upwards by 10 cm and back then the pistons also had the same 10 cm stroke. Frequent cycling of the pistons over large travel results in the oil being agitated, heating up and foaming resulting in a reduction of shock absorbing properties, a process known as fading.

Figure 5:
FIG. 5 depicts a prior art schematic showing the difference between dual-shock and single-shock systems with respect to performance of the oil damping mechanism.

In contrast, the monoshock systems have the single shock absorber system mounted towards the front of the rear swingarm near the fulcrum, as shown in FIG. 5. Accordingly, whilst the swingarm might still have a lot of travel at the axle, the deflection near the fulcrum is much less translating into shorter piston movements which in turn mean less opportunity for the damper oil to froth. This has evolved further to complex link monoshock systems which reduce the shock absorber piston travel even further through a complex series of levers.

Figure 7:
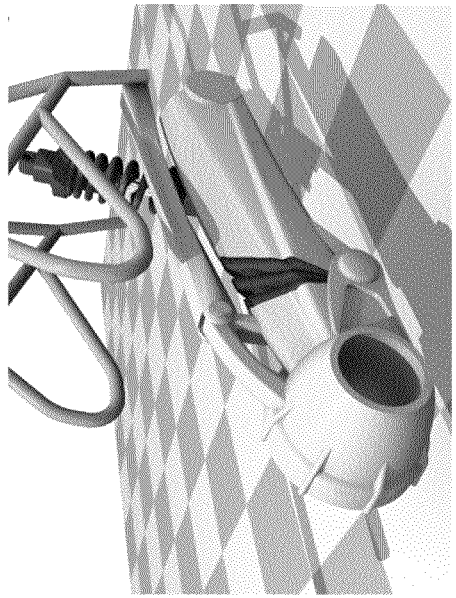
FIG. 7 depicts a prior art rear paralever, third generation, suspension for the rear wheel of a motorcycle.
Figure 6:
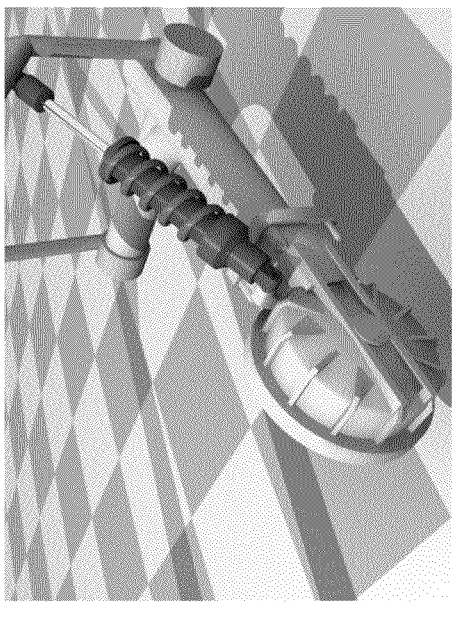
FIG. 6 depicts a prior art rear monolever suspension for the rear wheel of a motorcycle.

In 1980, BMW introduced the world to the monolever, shown in FIG. 6, where the shock/strut unit was mounted to one side of the motorcycle, rather than in the centre. The driveshaft ran down the inside of the single-sided swingarm and into the rear drive eliminating the need for increased engineering at the front of the swingarm which would have been needed to resist the torsional load of having the wheel mounted to a single-sided swingarm. Subsequently, the design was improved in 1987, 1993, and then again in 2004, shown in FIG. 7, wherein the control arm was moved above the shaft drive from underneath, and the rear drive was changed to have a hole through the middle of it to save weight.

Figure 8:
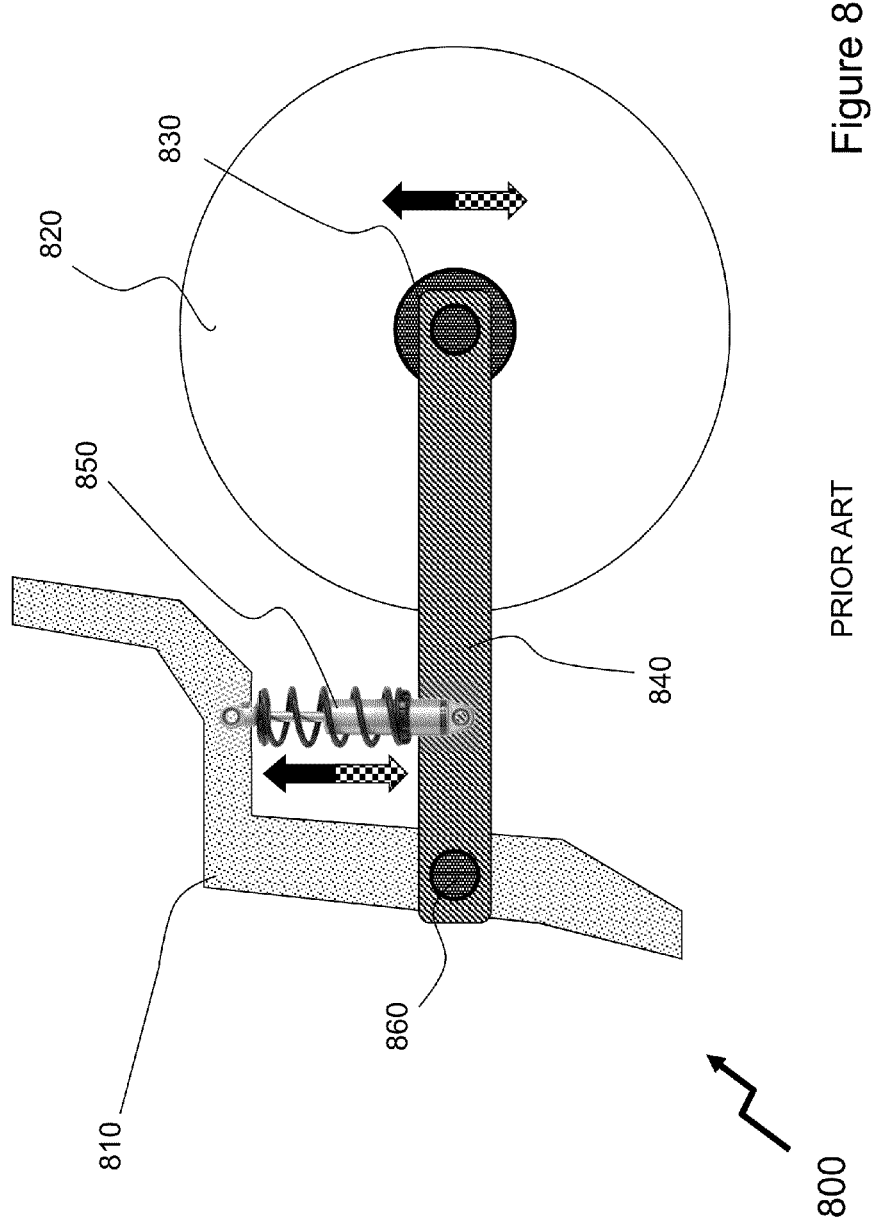
FIG. 8 depicts a schematic of the common design feature of the prior art shock absorber systems depicted in FIGS. 1 through 7.

Now referring to FIG. 8 there is depicted a prior art schematic 800 that depicts essentially a summary of the principles evident in respect of the prior art suspension systems presented above in respect of FIGS. 1 through 7. As such there is shown a rear wheel 820 having a hub 830 connected to swingarm 840. The swingarm 840 being mounted to the frame 810 at a fulcrum 860 such that the swingarm can pivot relative to the frame providing the required range of motion to accommodate variations in the surface (not shown for clarity). As evident in all of the prior art systems the shock absorber 840 is attached to the swingarm at a point disposed between the fulcrum and the rear wheel, further to the rear in older dual-shock and first generation paralevers and closer in monoshocks and later generation paralevers. Accordingly as shown the motion of the piston, not shown for clarity, within the shock absorber 840 is in the same direction as the motion of the rear wheel 820 relative to the frame 810.

In contrast, as shown in FIG. 9A, there is a suspension 900 according to an embodiment of the invention. As shown the frame, comprising first and second elements 910A and 910B is mounted to the swingarm 920 at a fulcrum 940. However, unlike prior art schematic 800 the swingarm 920 projects forward, as the wheel 960 is a rear wheel of the motorcycle, with section 920B. Mounted to the swingarm 920 between the fulcrum 940 and the hub 970 wherein the wheel 960 is mounted is first shock absorber 930. Also mounted to the swingarm 920, but to the section 920B forward of the fulcrum 940 is second shock absorber 950. As shown for suspension 900 the first and second shock absorbers 930 and 950 respectively are both mounted to the same part of the frame, namely first element 910A.

Accordingly, whilst first shock absorber 930 behaves in a manner similar to that of the shock absorbers discussed above in respect of FIGS. 1 through 7 in the piston motion is in the same direction relative to the frame as the wheel 960 the piston motion for the second shock absorber 950 is opposite. Likewise the coils in each of the first and second shock absorbers 930 and 950 behave oppositely also, such that when one is in compression the other is in tension, and vice-versa.

The term "bound" is normally used in reference to the rate at which a shock absorber compresses, whilst "rebound" refers to the rate at which the shocks decompress. Bound damping affects how far and fast the suspension travels up. When the suspension is on its way back down, rebound damping affects how far and fast it goes the other way. More precisely, bound damping affects the compression rate, while rebound damping affects the expansion rate. However, in the suspension 900 when the wheel 960 travels up the first shock absorber 930 performance is established by its bound, whilst the second shock absorber 950 has its performance determined by the rebound. When the wheel 960 travels down first shock absorber 930 performance is established by its rebound, whilst the second shock absorber 950 is determined by the bound. Depending upon the particular characteristics of the first and second shock absorbers 930 and 950 therefore the overall performance of the suspension can be established over a broader range than with a single shock absorber.

It would be evident to one skilled in the art that the suspension 900 may be adapted to dual-shock and paralever suspension systems as well as the monoshock suspension approach. Optionally, a single shock absorber disposed between the fulcrum and wheel may be countered at the other side of the fulcrum by multiple shock absorbers. Alternatively, a dual-shock suspension may be countered by a single shock absorber disposed at the other side of the fulcrum from the wheel. Depending upon the particular characteristics of the first and second shock absorbers 930 and 950 therefore the overall performance of the suspension can be established over a broader range than with a single shock absorber. Similarly, the travel of each shock absorber may be different and may or may not exploit linkages to reduce the range of movement for the pistons within the shock absorbers.

Figure 3B:
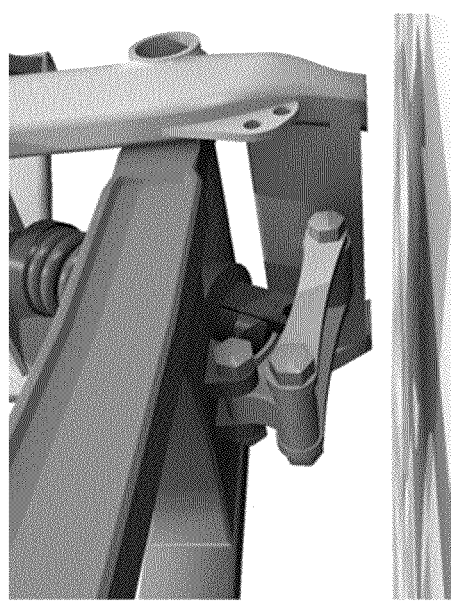
FIGS. 3A and 3B depicts a prior art monoshock, new style, regular swingarm suspension for the rear wheel of a motorcycle.
Figure 3A:
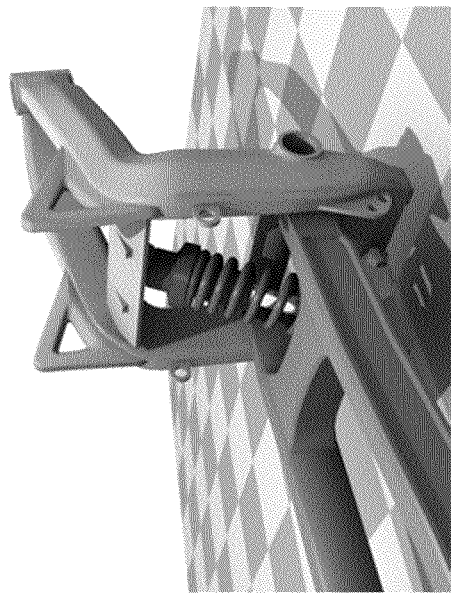

Referring to FIG. 9B there are depicted first to fourth suspensions 9100 through 9400 respectively that presented modified suspensions according to embodiments of the invention. Considering first suspension 9100 there is shown a modified twin-shock with a regular swingarm exploiting a modified H-shaped swingarm that is pivoted at the motorcycle frame along axis F-F with a counter direction shock absorber disposed further forward of the pivot axis F-F. Similarly second suspension 9200 depicts a modified mono-shock according to an embodiment of the invention wherein the original shock absorber sits within an opening within the modified H-shaped swingarm that is pivoted at the motorcycle frame along axis F-F. The counter direction shock absorber is disposed further forward of the pivot axis F-F mounted to the modified swingarm. Optionally, the counter direction shock absorber may be disposed into an opening and mounted to a base plate as depicted in FIG. 3B.

Third suspension 9300 depicts a modified single-sided monoshock swingarm according to an embodiment of the invention wherein the original shock absorber sits within an opening within the modified swingarm that is pivoted at the motorcycle frame along axis F-F. The counter direction shock absorber is disposed further forward of the pivot axis F-F mounted to the modified swingarm. Optionally, the counter direction shock absorber may be disposed into an opening and mounted to a base plate as depicted in FIG. 3B. Fourth suspension 9400 depicts a modified paralever according to an embodiment of the invention wherein the counter direction shock absorber is mounted forward of the frame mounting point M-M to the modified swingarm.

Figure 9C:
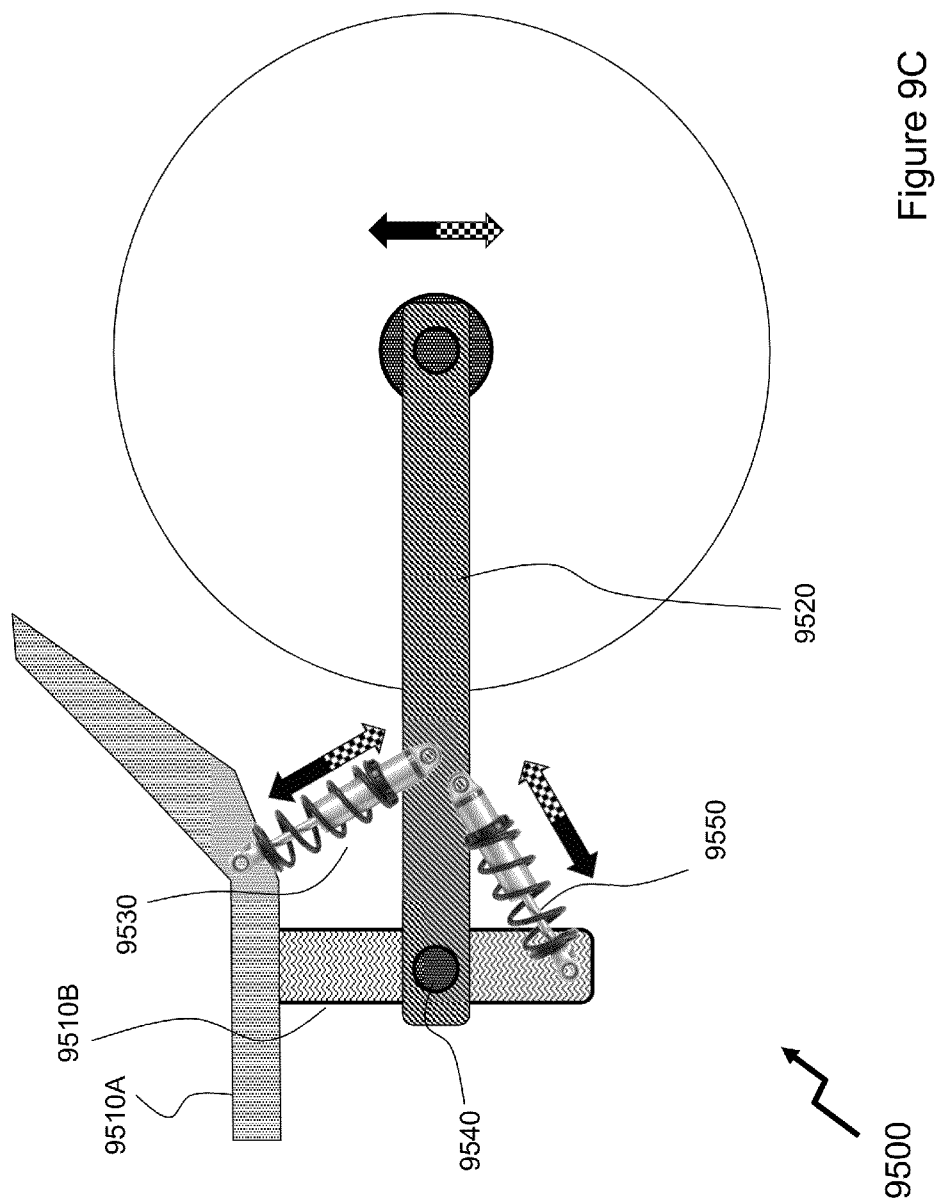
FIG. 9C depicts a modified suspension according to an embodiment of the invention.

Referring to FIG. 9C there is depicted a single side dual suspension 9500 according to an embodiment of the invention. Unlike suspension 900 discussed supra in respect of FIG. 9A shock absorber 9530 and counter direction shock absorber 9550 are now mounted on the same side of the swingarm 9520 relative to the fulcrum 9540. As shown shock absorber 9530 is mounted between the swingarm 9520 and first frame section 9510A whilst counter direction shock absorber 9550 is mounted between the swingarm 9520 and second frame section 9510B. Accordingly as depicted by directional arrows each of shock absorber 9530 and counter direction shock absorber 9550 move in opposite directions relative to the swing arm in a similar manner as suspension 900 but now the mechanical configuration is single sided for their mounting rather than either side of the fulcrum 9540.

Now referring to FIG. 9D there is depicted a single side dual suspension 9600 according to an embodiment of the invention. Unlike suspension 900 discussed supra in respect of FIG. 9A, but like single side dual suspension 9500 of FIG. 9C, the shock absorber 9630 and counter direction shock absorber 9650 are now mounted on the same side of the swingarm 9620 relative to the fulcrum 9640, albeit now at the opposite side of the fulcrum with respect to the wheel. As shown shock absorber 9630 is mounted between the swingarm 9620 and first frame section 9610A whilst counter direction shock absorber 9650 is mounted between the swingarm 9620 and second frame section 9610B. Accordingly as depicted by directional arrows each of shock absorber 9630 and counter direction shock absorber 9650 move in opposite directions relative to the swing arm in a similar manner as suspension 900 but now the mechanical configuration is single sided for their mounting rather than either side of the fulcrum 9640.

Accordingly single side dual suspensions 9500 and 9600 provide alternative design flexibility to the designer of an improved suspension for a motorcycle as opposed to prior art solutions but also provide different design spaces for the designer relative to the suspension 900 in FIG. 9A wherein the shock absorber and counter direction shock absorber are mounted on either side of the fulcrum. It would be apparent to one skilled in the art that whilst each of the single side dual suspensions 9500 and 9600 are presented as using two separate shock absorbers it would be evident to one skilled in the art that a single shock absorber body may be implemented using dual pistons in combination with either a single spring or multiple springs. Such a dual piston shock absorber being depicted in the insert of FIG. 9D wherein the interconnection between the two elements may be linear or another predetermined shape according to the mounting and suspension design.

Figure 10:
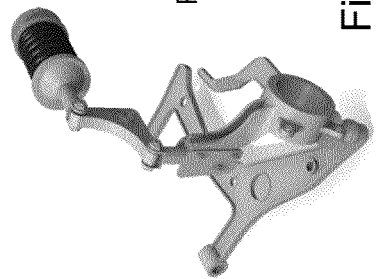
FIG. 10 depicts a prior art McPherson strut suspension for the front wheel of a car.

Now turning to the front suspension of a car then typically today these are referred to as independent systems as the suspension for each front wheel is independent of the other, except where interconnected with an anti-roll bar. Since their introduction around 1930 independent front suspension systems have been in use in one form or another pretty much ever since. The MacPherson Strut (also known as the McPherson strut), shown in FIG. 10, dominates in cars of European origin having been introduced by Ford in the early 1950s. It comprises of strut-type spring and shock absorber combo, which pivots on a ball joint on the single, lower arm. The strut itself is the load-bearing member in this assembly, with the spring and shock absorber merely performing their duty as opposed to actually holding the car up. The steering gear is either connected directly to the lower shock absorber housing, or to an arm from the front or back of the spindle as shown in FIG. 10, wherein the steering gear physically twists the strut and shock absorber housing (and consequently the spring) to turn the wheel.

Figure 11:
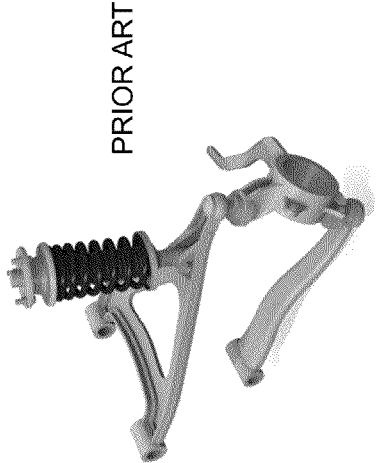
FIG. 11 depicts a prior art derivation of the McPherson strut suspension for the front wheel of a car.

A variant of the MacPherson is the so-called "Rover MacPherson" wherein a bellcrank was added allowing the suspension unit to sit horizontally along the outside of the engine bay rather than protruding into it and taking up space. The bellcrank transfers the upward forces from the suspension into rearward forces for the coilover to handle, as shown in FIG. 11. Another prior art suspension approach is the double wishbone, shown in FIGS. 12 and 13. The double-A wishbone suspension depicted in FIG. 12 has the wheel spindles supported by upper and lower "A" shaped arms where the shock absorber is mounted to the lower "A". A coil spring type double-A wishbone suspension, depicted in FIG. 13, moves the shock absorber from between the arms to above the upper arm and may, as shown, replace the lower arm with a single solid arm.

Figure 14:
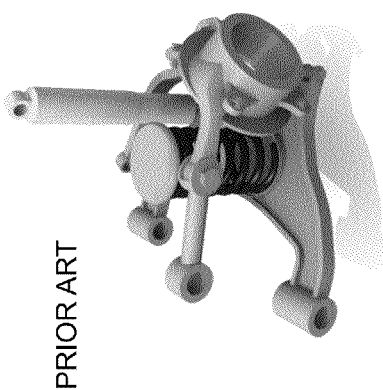
FIG. 14 depicts a prior art multi-link suspension for the front wheel of a car.

Multi-link suspensions, such as shown in FIG. 14, are the latest extension of these double wishbone suspension systems wherein instead of solid upper and lower wishbones, each 'arm' of the wishbone is a separate item, joined at the top and bottom of the spindle thus forming the wishbone shape. In steering the spindle turns and alters the overall geometry of the suspension by torqueing all four suspension arms. In the prior art design depicted in FIG. 14 the spring is separate from the shock absorber. Currently, many variants of this design approach are in commercial use with varying joint complexities, numbers of arms, positioning of the parts etc.

Figure 15:
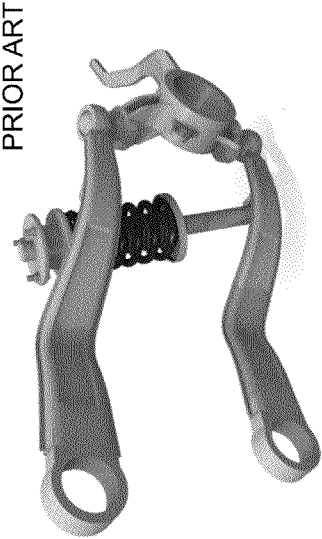
FIG. 15 depicts a prior art trailing arm suspension for the front wheel of a car.
Figure 16:
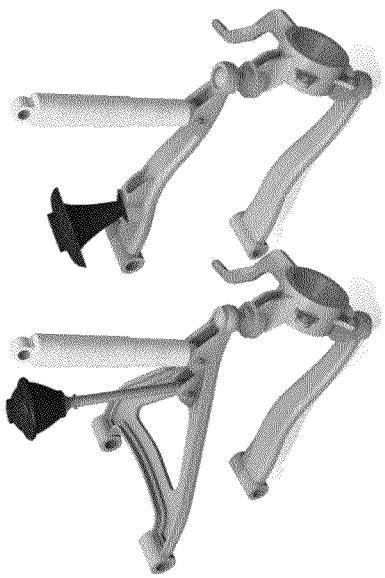
FIG. 16 depicts a prior art Moulton suspension for the front wheel of a car.

Referring to FIG. 15, a trailing arm suspension system is shown wherein suspension arms are joined at the front of the chasing allowing the rear to swing up and down and employs a coil over shock absorber. In FIG. 16 a "Moulton" suspension is depicted wherein the spring has been replaced by a solid mass of rubber necessitating a separate shock absorber. The "Moulton" rubber suspension has also been used a lot in bicycles, primarily racing and mountain bikes, due to its compact design and the simplicity of its operation and maintenance. With recent developments in materials it has tended to be replaced by more advanced, lightweight designs.

Figure 17:
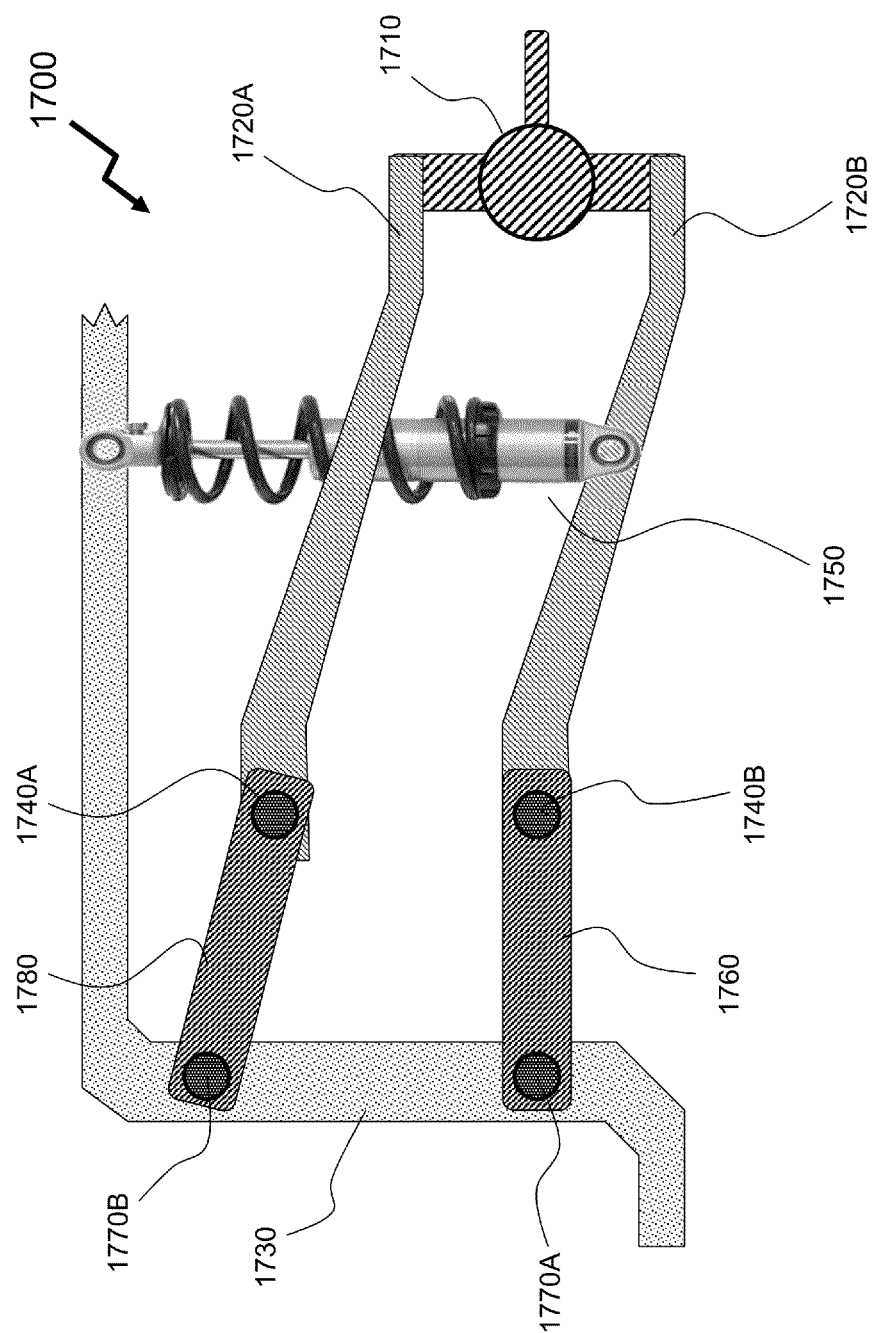
FIG. 17 depicts a schematic of the common design feature of the prior art car suspensions according to FIGS. 10 through 16.

Now referring to FIG. 17 there is shown a schematic 1700 that depicts the core common principle behind the suspension systems depicted above in respect of FIGS. 12 through 16. Accordingly a spindle 1710 is connected to an upper arm 1720A and lower arm 1720B. Coupled at first fulcrum 1740A on upper arm 1702A is first link 1780 that is joined to the frame 1730 via first mount 1770B. Likewise at second fulcrum 1740B on lower arm 1720B a second link 1760 is connected to the frame 1730 at second mount 1770A.

Accordingly motion of the wheel, not shown for clarity, connected to the spindle 1710 relative to the frame 1730 results in first and second arms 1720A and 1720B rotating about the first and second fulcrums 1740A and 1740B respectively. Connected between the second arm 1720B and the frame 1730 is shock absorber 1750 which is disposed between the fulcrums and the spindle 1710 thereby providing the energy absorption through the spring and damping through the piston.

Figure 18:
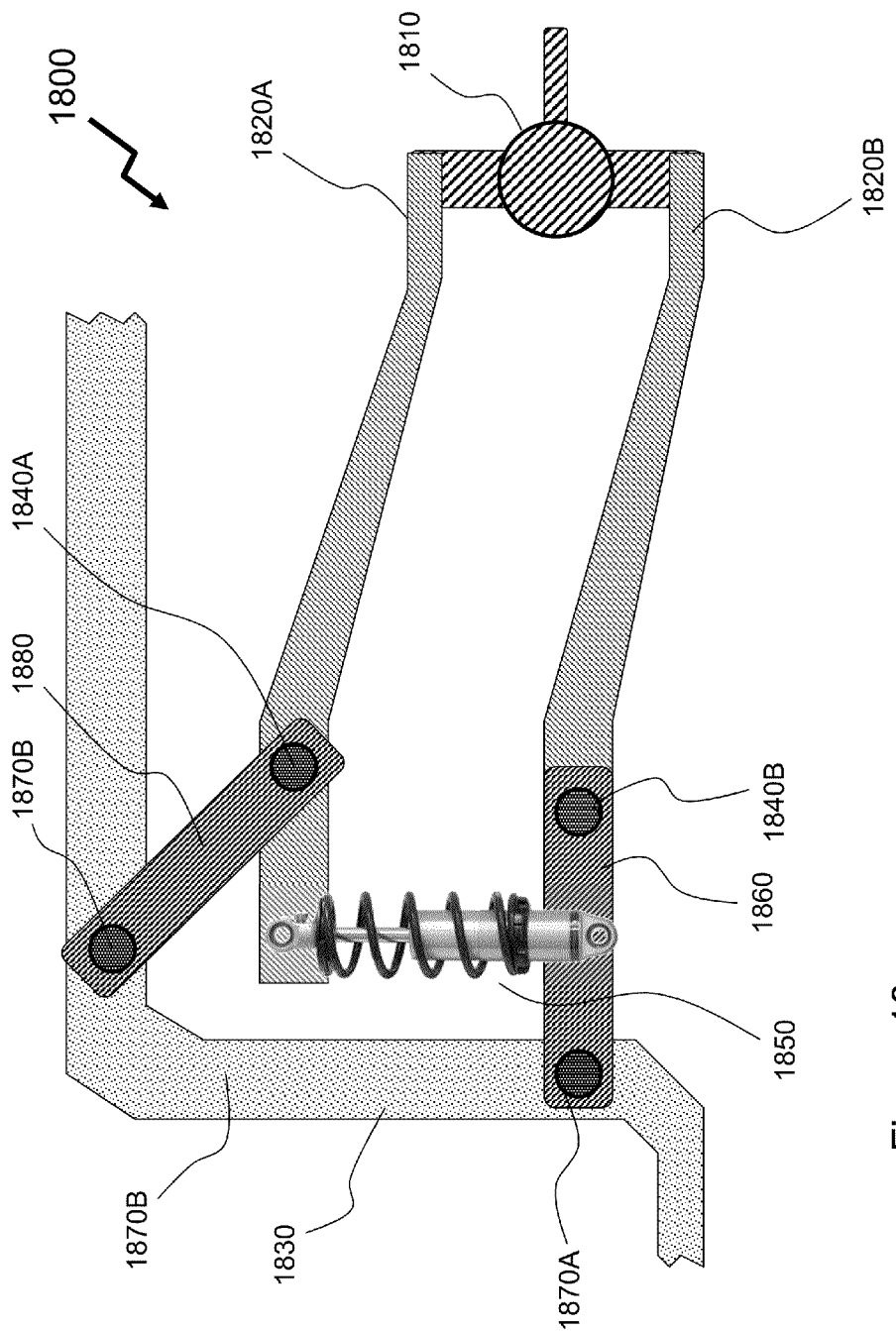
FIG. 18 depicts a schematic of a front wheel suspension for a car according to an embodiment of the invention.

Now referring to FIG. 18 there is depicted a suspension 1800 according to an embodiment of the invention. As depicted the spindle 1810 is connected to upper arm 1820A and lower arm 1820B. Lower arm 1820B is connected to lower link 1860 via first fulcrum 1840B and therein to the frame 1830 at first mounting point 1870A. Upper arm 1820A is connected to the frame 1830 to upper link 1880 via second fulcrum 1840A and therein to the frame 1830 at second mounting point 1870B. However, the shock absorber 1850 is now mounted between the upper arm 1820A and lower arm 1820B between the fulcrum points and the frame 1830. Accordingly now motion of the wheel, not shown for clarity, relative to the frame 1830 results in relative motion of the upper arm 1820A, connected to the frame 1830 through second link 1880, with respect to lower arm 1820B, connected to the frame 1830 through first link 1860.

Figure 12:
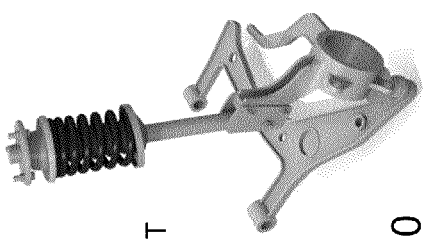
FIG. 12 depicts a prior art double wishbone strut suspension for the front wheel of a car.
Figure 13:
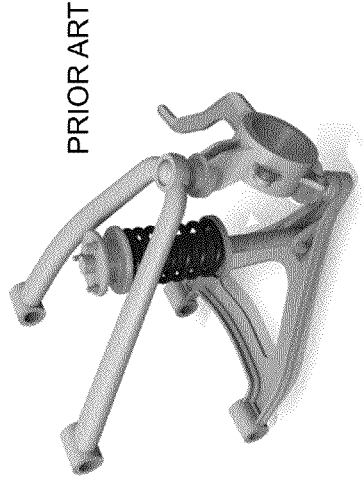
FIG. 13 depicts a prior art coil spring suspension for the front wheel of a car.

Optionally, a suspension such as the double-A wishbone suspension depicted in FIG. 12 may be adapted such that dual shock absorbers are employed linking the upper "A" to the lower "A" or in the case of a coil spring type double-A wishbone suspension, depicted in FIG. 13, dual shock absorbers may be deployed between the single lower arm and the upper long legs of the upper "A". Optionally, the MacPherson suspension structures depicted in FIGS. 10 and 11 may also be adapted by replacing the shock absorber with a linkage to the frame and coupling one or more shock absorbers between the lower plate and an extension of the upper section.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
providing an arm comprising a hub disposed to one end of the arm for mounting a wheel and a mounting point disposed along the length of the arm for attaching the arm to a frame wherein the arm pivots about the mounting point;
a first shock absorber mounted at one end to the arm at a first predetermined point and at the other end to a first predetermined point on the frame;
a second shock absorber mounted at one end to the arm at a second predetermined point and at the other end to a second predetermined point on the frame;
a third shock absorber mounted at one end to the arm at a third predetermined point and at the other end to a third predetermined point on the frame; and
wherein vertical motion of the wheel results in either compression and expansion of the first and third shock absorbers together and the other of compression and expansion of the second absorber.

2. The method according to claim 1 wherein,
the first predetermined point is between the mounting point and the end of the arm with the hub; and
the second predetermined point is between the mounting point and another distal end of the arm disposed to the other side of the mounting point from the hub.

3. The method according to claim 1 wherein,
the first and third predetermined points are between the mounting point and the end of the arm with the hub but on opposite sides of the wheel; and
the second predetermined point is between the mounting point and another distal end of the arm disposed to the other side of the mounting point from the hub.

4. The method according to claim 1 wherein,
the first predetermined point is between the mounting point and another distal end of the arm disposed to the other side of the mounting point from the hub on one side of the arm; and
the second predetermined point is between the mounting point and another distal end of the arm disposed to the other side of the mounting point from the hub on the other side of the arm.

5. The method according to claim 1 wherein,
the first predetermined point is between the mounting point and the end of the arm with the hub on one side of the arm; and
the second predetermined point is between the mounting point and the end of the arm with the hub on the other side of the arm.

6. The method according to claim 4 wherein,
the first and second shock absorbers are first and second predetermined portions of a single shock absorber assembly.

7. The method according to claim 5 wherein,
the first and second shock absorbers are first and second predetermined portions of a single shock absorber assembly.

8. A method comprising:
providing a hub for mounting a wheel comprising an upper mount and a lower mount;
providing a lower arm coupled to the lower mount of the hub one on end and having a fulcrum mounting at the other distal end;
providing a first link pivotably mounted to the fulcrum mounting of the lower arm at one end and a frame at the other distal end;
providing an upper arm coupled to the upper mount of the hub at one end and having a fulcrum mounting at a first predetermined position on the upper arm between the one and the other distal end; and
providing a second link pivotably mounted at one end to the fulcrum on the upper arm and to a second predetermined position on the frame.

9. The method according to claim 8 further comprising;
providing a shock absorber mounted at one end to the first link and at the other end to the upper arm at a predetermined location between the fulcrum on the upper arm and the other distal end of the upper arm from the hub.

10. The method according to claim 8 wherein,
the hub, lower arm, and upper arm are predetermined portions of a single part.

11. The method according to claim 8 wherein,
the first and second links are pivotably mounted to the frame.

* * * * *